United States Patent [19]

Momochi

[11] Patent Number: 5,528,420
[45] Date of Patent: Jun. 18, 1996

[54] METHOD OF AND APPARATUS FOR OUTPUTTING IMAGES

[75] Inventor: Nobuchika Momochi, Kanagawa, Japan

[73] Assignee: Sony Corporation, Tokyo, Japan

[21] Appl. No.: 297,814

[22] Filed: Aug. 30, 1994

[30] Foreign Application Priority Data

Sep. 9, 1993 [JP] Japan .................................. 5-248884

[51] Int. Cl.⁶ .................................................. G02B 27/22
[52] U.S. Cl. ............................................ 359/463; 359/462
[58] Field of Search .................................... 359/462, 463, 359/478, 619; 348/51, 59; 355/22

[56] References Cited

U.S. PATENT DOCUMENTS

| | | | |
|---|---|---|---|
| 3,895,867 | 7/1975 | Lo et al. ....................................... | 355/77 |
| 4,959,641 | 9/1990 | Bass et al. .................................. | 345/139 |
| 4,987,487 | 1/1991 | Ichinose et al. .......................... | 348/59 |

FOREIGN PATENT DOCUMENTS 287792   3/1990   Japan .
397390   4/1991   Japan .

OTHER PUBLICATIONS

Production Research, vol. 41, No. 11, 1989.
Television Engineering Society, vol. 45, No. 11, 1991.

*Primary Examiner*—Paul M. Dzierzynski
*Assistant Examiner*—Darren E. Schuberg
*Attorney, Agent, or Firm*—Ronald P. Kananen

[57] ABSTRACT

The invention provides an image outputting method and apparatus by which an optimum stereoscopic display can be obtained upon visual observation of a plurality of parallax images through a lenticular lens device. In order to allow stereoscopic vision of images through a plurality of lenticular lenses arranged at a predetermined pitch p, picture element data photographed from different points of view are successively outputted for each set of n picture elements for one pitch of the lenticular lenses. The pitch of each set of picture element data corresponding to one lenticular lens is set greater than the arrangement pitch p of the lenticular lenses by an increment ε which substantially satisfies ε/p= Δ/W where Δ is the distance between a pair of small image portions under the lenticular lens device which are visually observed separately by the two eyes through one of the lenticular lenses, and W is the pupil distance of the observer.

15 Claims, 16 Drawing Sheets

FIG. IA
FIG. IB
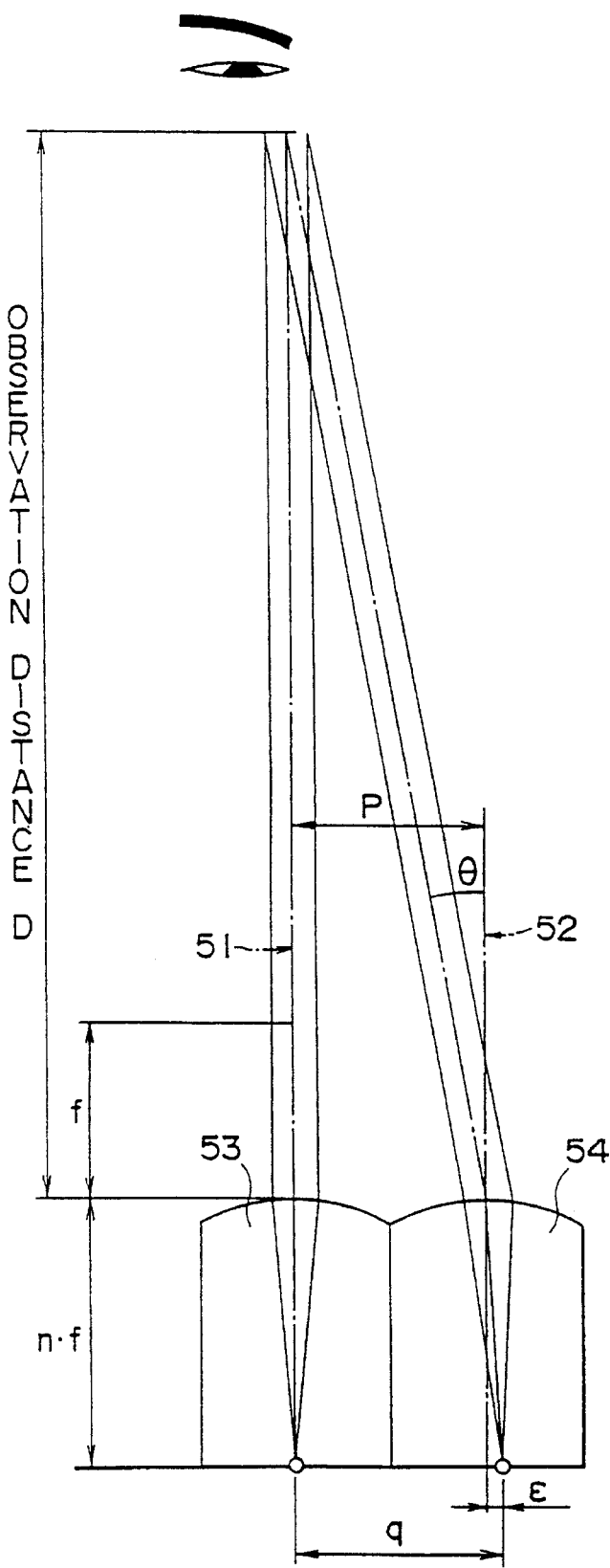
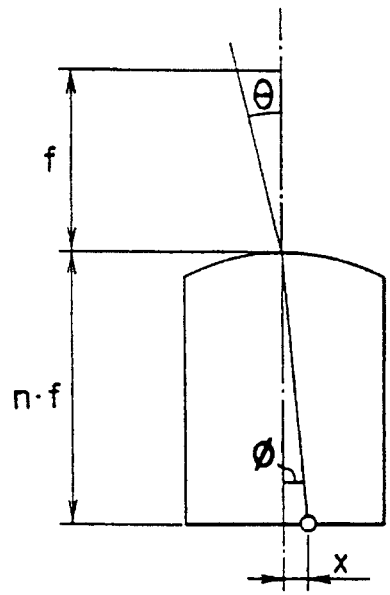

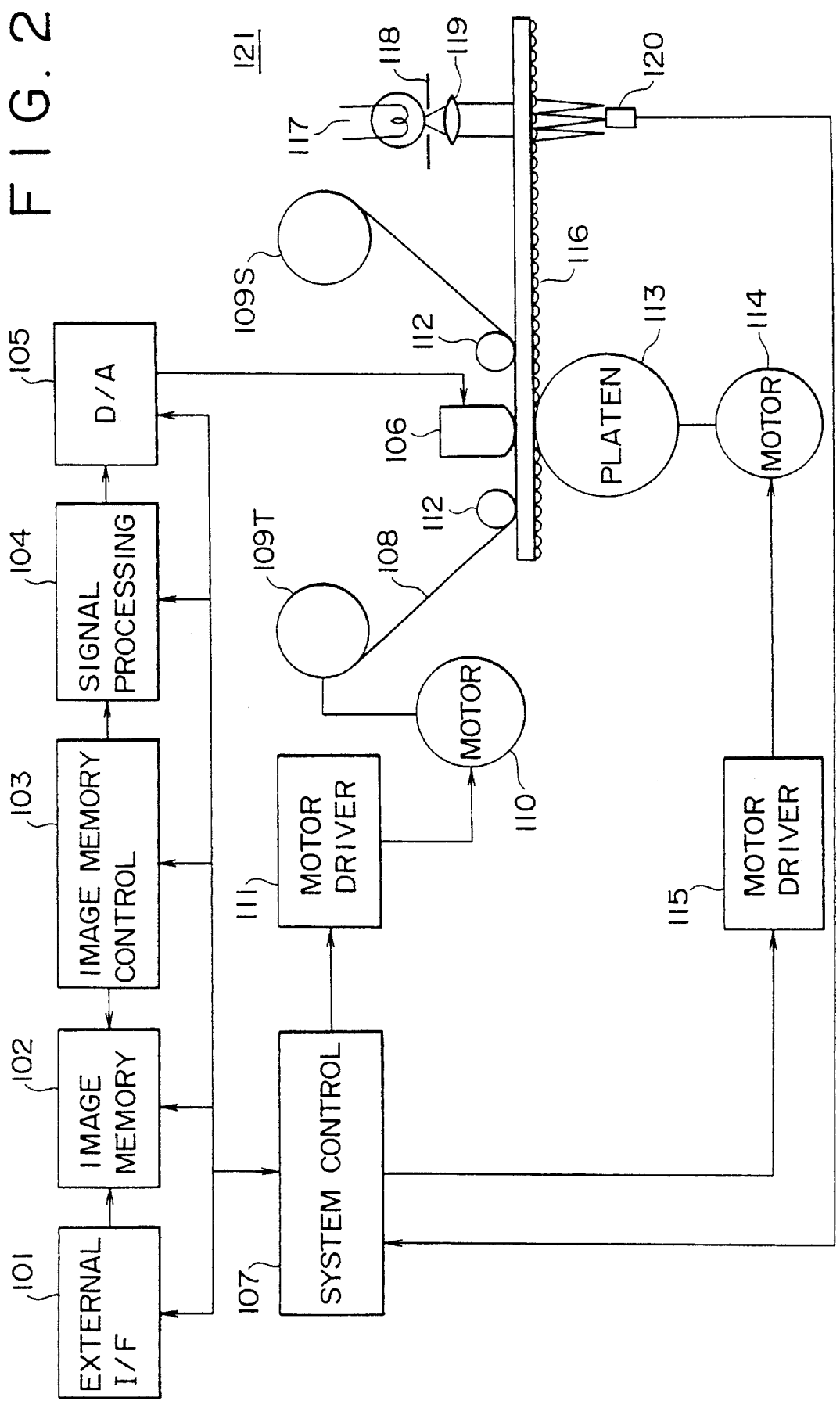

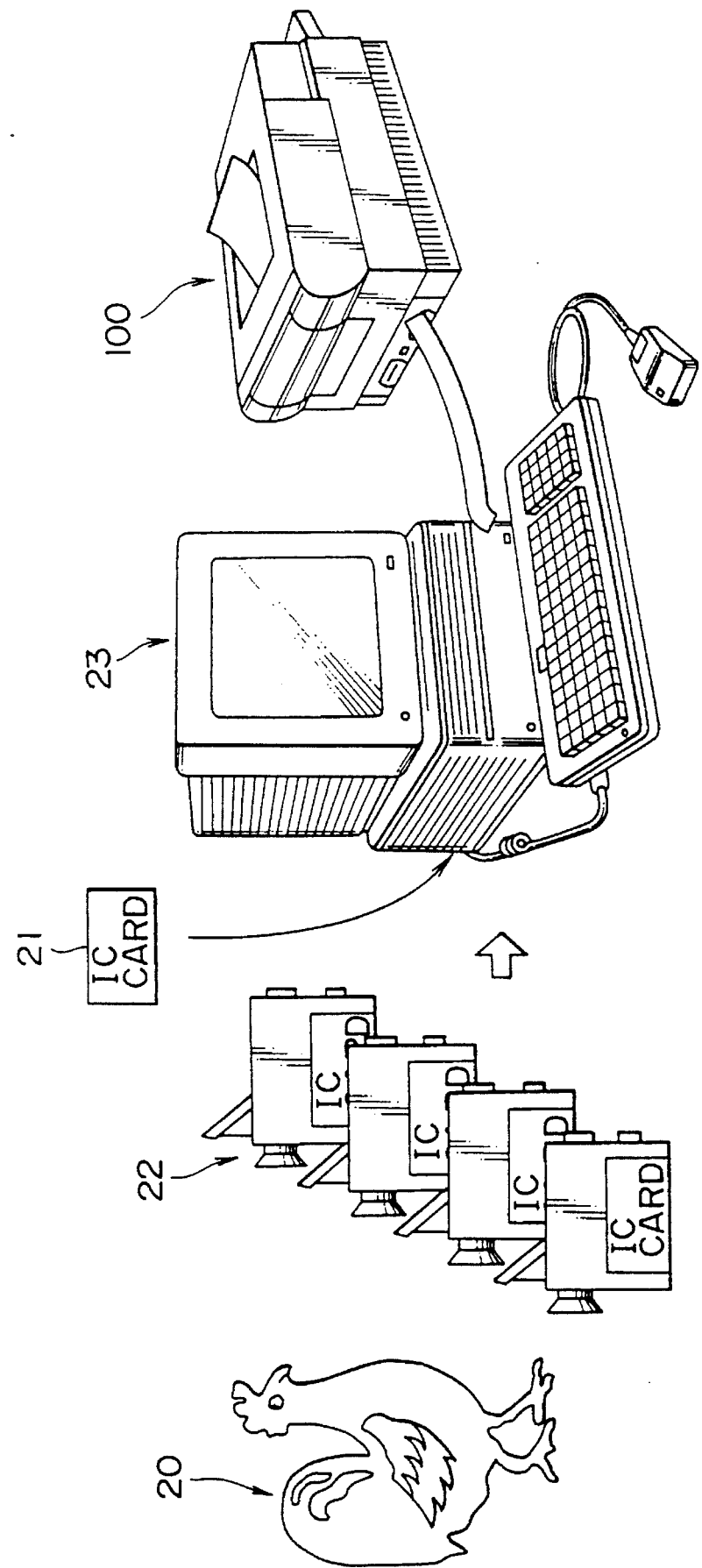

FIG. 14

| LENS No. | A: STRICT VALUE | B: CORRECTION 1 | C: B-A | D: CORRECTION 2 | E: D-A | F: CORRECTION 3 | G: F-A |
|---|---|---|---|---|---|---|---|
| 10.0000 | 5.0129 | 5.0129 | 0.0000 | 5.0129 | -0.0000 | 5.0125 | -0.0004 |
| 20.0000 | 10.0257 | 10.0257 | 0.0000 | 10.0257 | -0.0000 | 10.0249 | -0.0008 |
| 30.0000 | 15.0385 | 15.0386 | 0.0000 | 15.0385 | -0.0000 | 15.0374 | -0.0012 |
| 40.0000 | 20.0513 | 20.0514 | 0.0001 | 20.0513 | -0.0000 | 20.0498 | -0.0015 |
| 50.0000 | 25.0641 | 25.0643 | 0.0002 | 25.0641 | -0.0000 | 25.0623 | -0.0018 |
| 60.0000 | 30.0768 | 30.0771 | 0.0003 | 30.0768 | -0.0000 | 30.0747 | -0.0021 |
| 70.0000 | 35.0895 | 35.0900 | 0.0005 | 35.0895 | -0.0000 | 35.0872 | -0.0023 |
| 80.0000 | 40.1021 | 40.1028 | 0.0007 | 40.1021 | -0.0000 | 40.0997 | -0.0025 |
| 90.0000 | 45.1147 | 45.1157 | 0.0010 | 45.1146 | -0.0000 | 45.1121 | -0.0026 |
| 100.0000 | 50.1271 | 50.1285 | 0.0014 | 50.1271 | -0.0000 | 50.1246 | -0.0026 |
| 110.0000 | 55.1395 | 55.1414 | 0.0018 | 55.1395 | -0.0000 | 55.1370 | -0.0025 |
| 120.0000 | 60.1519 | 60.1542 | 0.0024 | 60.1518 | -0.0000 | 60.1495 | -0.0024 |
| 130.0000 | 65.1641 | 65.1671 | 0.0030 | 65.1640 | -0.0000 | 65.1619 | -0.0021 |
| 140.0000 | 70.1762 | 70.1799 | 0.0038 | 70.1761 | -0.0000 | 70.1744 | -0.0018 |
| 150.0000 | 75.1882 | 75.1928 | 0.0046 | 75.1881 | -0.0000 | 75.1869 | -0.0013 |
| 160.0000 | 80.2001 | 80.2057 | 0.0056 | 80.2000 | -0.0001 | 80.1993 | -0.0008 |
| 170.0000 | 85.2119 | 85.2185 | 0.0066 | 85.2118 | -0.0001 | 85.2118 | -0.0001 |
| 180.0000 | 90.2235 | 90.2314 | 0.0078 | 90.2235 | -0.0001 | 90.2242 | 0.0007 |
| 190.0000 | 95.2350 | 95.2442 | 0.0092 | 95.2350 | -0.0001 | 95.2367 | 0.0016 |
| 200.0000 | 100.2464 | 100.2571 | 0.0106 | 100.2464 | -0.0001 | 100.2491 | 0.0027 |

METHOD OF AND APPARATUS FOR OUTPUTTING IMAGES

BACKGROUND OF THE INVENTION

This invention relates to an image inputting method and apparatus for displaying an image through a lenticular lens device.

A lenticular lens system is proposed as a system for realizing a stereoscopic image display of the so-called multi-eye type by which a stereoscopic image can be visually observed from multi-directional points of view without glasses.

For example, U.S. Pat. No. 3,895,867 discloses a lenticular lens system wherein a negative film is photographed by means of a plurality of cameras spaced by a distance equal to a parallax and is printed onto a photographic film by way of a lens plate on which a plurality of lenticular lenses are arranged to obtain a so-called lenticular print which has a stereoscopic visual effect.

Meanwhile, also an attempt to combine a lenticular lens device with a television set to realize a stereoscopic television system has been made. In particular, Japanese Patent Laid-Open Application No. Heisei 3-97390 discloses a system wherein a television image is outputted compositely to a rear face of a lenticular lens device having a plurality of lenticular lenses arranged at a predetermined pitch P.

The first prior art system described above requires photographing by means of a camera using a film and printing onto photographic paper through the lenticular lens system. Also a dark room is required for development and printing.

Further, the first prior art system described above relies, in regard to what construction of images produced under the lenticular lens system allows stereoscopic vision with the two eyes, upon the reciprocity of image formation that original different images having a parallax between them are visually observed by the two eyes if images obtained by forming and printing negative images spaced by a distance equal to the parallax through a lenticular lens system are visually observed through the same lenticular lens system, but a method of producing an image to be placed directly below a lenticular lens system is not proposed by the lenticular lens system of the first prior art document described above.

It is to be noted that geometrical characteristics of such images projected by way of a lens system as are obtained by the first prior art lenticular lens system are disclosed in "Geometrical Characteristics of Stereoscopic Images of Continuous Visual Area Lens Plate", Production Research, Vol. 41, No. 11, November 1989, and it is reported in the document that the pitch of images obtained by projection is a little greater than the pitch p of the lenticular lenses in the direction of the arrangement of the lenticular lenses. The document of the first prior art lenticular lens system does not disclose a method of forming images to be placed immediately below lenses.

For the second prior art system, a method is reported in "50-Inch Multi-Eye Stereoscopic Television without Glasses", Journal of the Japanese Television Engineering Society, Vol. 45, No. 11. According to the report, images are arranged on the rear face of the lenticular lens system such that, in order to compose images of n cameras which photograph from different points of view, picture elements of the totaling n cameras are successively arranged with picture elements from a camera allocated to one pitch of the lenticular lenses while the other n−1 picture elements per one camera are abandoned. It is further reported that, according to the method, one of n picture elements for one pitch is selectively displayed for one point of view by the lenticular lens system and different images are displayed on the two eyes.

Further, for further detailed construction of images, a manner in which picture elements are arranged is disclosed in Japanese Patent Laid-Open Application No. Heisei 3-97390 mentioned hereinabove. The prior art document discloses, in addition to a method wherein original n image data are collected each by 1/n by sampling to compose a single image of the original size similarly as in the document entitled "50-Inch Multi-Eye Stereoscopic Television without Glasses" mentioned hereinabove, another method wherein n different data for each one lenticular lens, that is, per one pitch of the lenticular lenses, are arranged in a transverse direction without performing sampling while a picture element is repeated by n times in the longitudinal direction of the lenticular lenses to obtain data of the size of n×n.

However, any of the prior art documents which discloses the second lenticular lens system does not disclose such a displacement in pitch as disclosed in the document "Geometrical Characteristics of Stereoscopic Images of Continuous Visual Area Lens Plate" mentioned hereinabove.

FIG. 16 indicates loci of beams of light passing from different picture elements through the centers of spherical phases of lenticular lenses where one pitch of the lenticular lenses corresponds to three picture elements so that the pitch of three picture elements just coincides with the pitch of the lenticular lenses. In FIG. 16, the lenticular lenses are arranged at the pitch of 0.5 mm and are shown in an enlarged view with the scale of 100:1. In this instance, images formed from picture elements A cannot be observed by a single eye at any position.

Further, a method of determining whether or not such a lenticular image display is appropriate upon actual observation of a display image has not been proposed as yet, and it cannot be avoided to directly determine whether or not there is a stereoscopic visual effect.

Further, since a moving picture is displayed, in the document "50-Inch Multi-Eye Stereoscopic Television without Glasses" mentioned hereinabove, as a signal of a composite image using a high definition television signal, the scanning direction (scanning line) of an output image on the rear face of the lenticular lens system is the horizontal direction of the screen, and also the arrangement of the lenticular lenses is the horizontal direction. Accordingly, an optimum scanning direction has not been proposed as yet.

For example, where an image printer of the thermal sublimation type having a line thermal head is used as an image output apparatus, the resolution is high in the thermal printing element arrangement direction of the head, but is low in the feeding direction. Consequently, if the feeding direction of the line thermal head is coincident with the arrangement direction of the lenticular lenses, then when it is tried to selectively observe one of adjacent picture elements in such a display as a stereoscopic visual display wherein lenticular lenses are employed, an adjacent picture element, that is, an image component of a different parallax, may possibly be mixed and have a bad influence upon the stereoscopic vision.

On the other hand, in the case of a line thermal head, the pitch of output picture elements is fixed, and where lenticular lenses are arranged in the line arrangement direction of the head, the lenses must be formed at a pitch corresponding to the arrangement pitch of heads and cannot be adjusted.

SUMMARY OF THE INVENTION

It is an object of the present invention to provide an image outputting method and apparatus by which, where a plurality of images of different parallaxes are composed and outputted so that they are displayed through lenticular lenses, an optimum stereoscopic display can be achieved for the pitch and the focal length of the lenticular lenses, the number of images of different parallaxes, the distance between the eyes, the observation distance of the images and some other parameters.

It is another object of the present invention to provide an image outputting method and apparatus by which it can be determined readily whether or not a display condition is appropriate.

It is a further object of the present invention to provide an image outputting method and apparatus by which the pitch of lenticular lenses and the pitch of output images can be adjusted so that a high resolution of selection of parallax images by the lenticular lenses may be assured in accordance with characteristics of an output apparatus.

In the present invention, as outputs for displaying a plurality of images having a parallax or parallaxes through a plurality of lenticular lenses arranged at a predetermined pitch p, the images are outputted while the pitch of each set of images corresponding to the pitch p of the lenticular lenses is set a little greater than the pitch p of the lenticular lenses. The increment in pitch is optimized for the pitch p, the focal length of the lenticular lenses, the number of images of different parallaxes, the pupil width, the observation distance of the images and some other parameters so that one of n sets of different parallaxes may be selectively observed visually by the two eyes.

In particular, in order to attain the object described above, according to an aspect of the present invention, there is provided a method of outputting images for stereoscopic vision, which comprises the steps of using a lenticular lens device including a plurality of lenticular lenses arranged at a predetermined pitch p, storing picture element data having a parallax, and successively outputting data of picture elements having a parallax for each set of n picture elements per one pitch of the lenticular lenses, the pitch of each set of data of picture elements corresponding to one lenticular lens being set, at the last successive outputting step, greater than the arrangement pitch p of the lenticular lenses.

With the method, since, as outputs for displaying a plurality of images having a parallax or parallaxes through a plurality of lenticular lenses arranged at a predetermined pitch, data of picture elements having a parallax are successively outputted for each set of n picture elements per one pitch of the lenticular lenses while the pitch of each set of data of picture elements corresponding to one lenticular lens is set greater than the arrangement pitch of the lenticular lenses, picture element outputs are optimized for the arrangement pitch of the lenticular lenses, the focal length of the lenticular lenses, the number of images of different parallaxes, the pupil width, the observation distance of the images and some other parameters, and consequently, one of n sets of different parallaxes may be selectively observed visually by the two eyes.

Preferably, a regular image of a period corresponding to the pitch of the lenticular lenses is additionally provided on the display images so that displacement in pitch of the regular image from the lenticular lenses can be discriminated. The presence of the regular image allows discrimination upon visual observation of the picture element outputs whether or not the display condition is appropriate.

According to another aspect of the present invention, in order to reduce the method of the invention to practice, there is provided an apparatus for outputting images for stereoscopic vision, which comprises a lenticular lens device including a plurality of lenticular lenses arranged at a predetermined pitch p, means for storing data of picture elements having a parallax, and means for successively outputting data of picture elements having a parallax for each set of n picture elements per one pitch of the lenticular lenses while setting the pitch of each set of picture element data greater than the arrangement pitch p of the lenticular lenses.

According to a further aspect of the present invention, there is provided a method of outputting images for stereoscopic vision, which comprises the steps of using a lenticular lens device including a plurality of lenticular lenses arranged at a predetermined pitch p, storing picture element data having a parallax, and successively outputting data of picture elements having a parallax for each set of n picture elements per one pitch of the lenticular lenses, the pitch of each set of picture elements corresponding to one pitch of the lenticular lenses being set, at the last successive outputting step, smaller at a peripheral portion of the lenticular lens device in the arrangement direction of the lenticular lenses than at a central portion of the lenticular lens device in the arrangement direction of the lenticular lenses.

According to a still further aspect of the present invention, in order to reduce the method of the invention to practice, there is provided an apparatus for outputting images for stereoscopic vision, which comprises a lenticular lens device including a plurality of lenticular lenses arranged at a predetermined pitch p, means for storing data of picture elements having a parallax, and means for successively outputting data of picture elements having a parallax for each set of n picture elements per one pitch of the lenticular lenses while setting the pitch of each set of picture elements smaller at a peripheral portion of the lenticular lens device in the arrangement direction of the lenticular lenses than at a central portion of the lenticular lens device in the arrangement direction of the lenticular lenses.

The above and other objects, features and advantages of the present invention will become apparent from the following description and the appended claims, taken in conjunction with the accompanying drawings in which like parts or elements are denoted by like reference characters.

BRIEF DESCRIPTION OF THE DRAWINGS

FIGS. 1A and 1B are diagrammatic views illustrating the principle of an image outputting method according to the present invention;

FIG. 2 is a block diagram of an image outputting apparatus showing a preferred embodiment of the present invention;

FIG. 3 is an illustration showing an image outputting system in which the image outputting apparatus shown in FIG. 2 is incorporated;

FIG. 14 is a table listing values of a result of an experiment conducted to confirm effects of the present invention;

SUMMARY OF THE INVENTION

Figure 4:
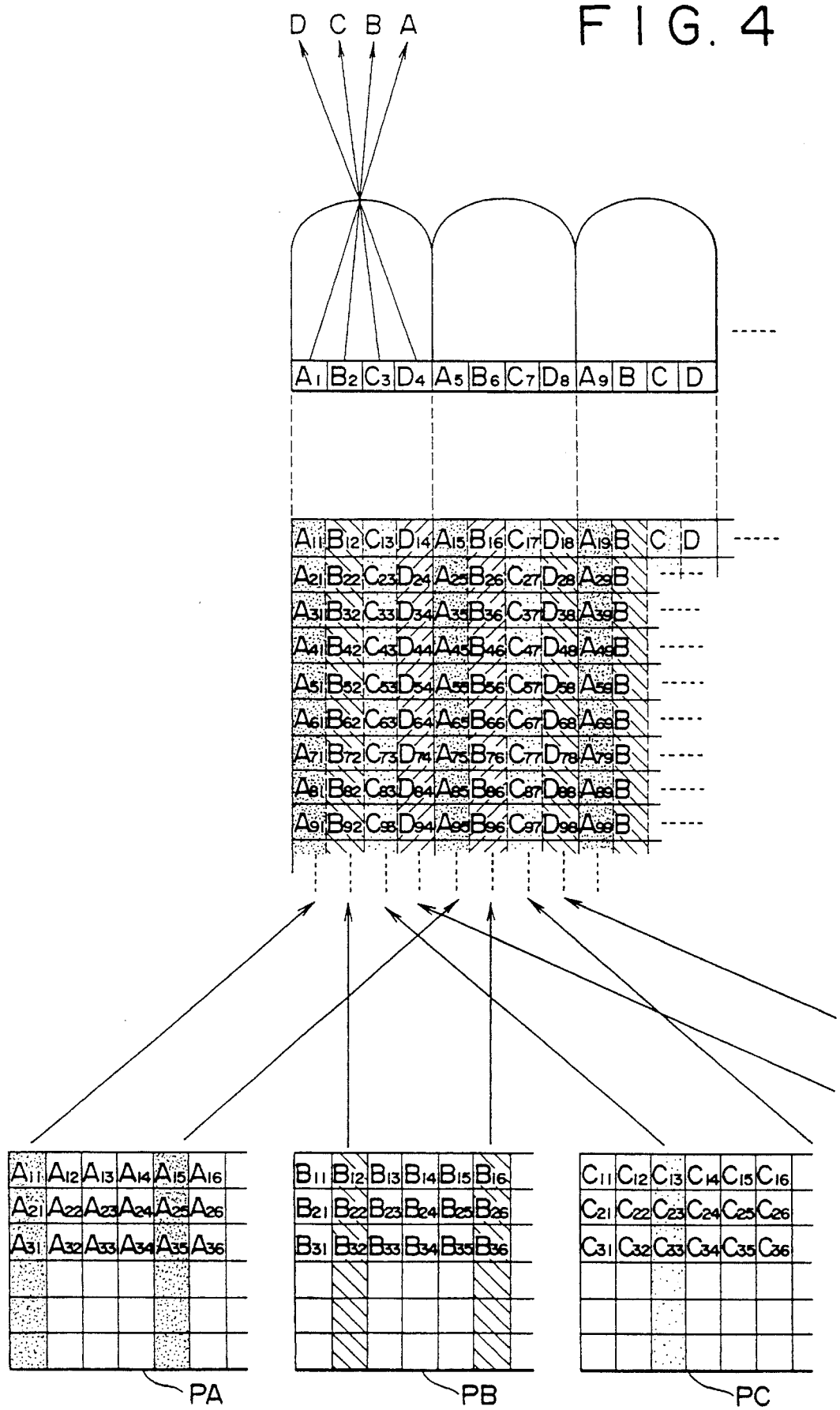
FIGS. 4 and 5 are diagrammatic views illustrating the relationship of a set of image outputs to one pitch of lenticular lenses of the image outputting apparatus shown in FIG. 2.

Referring first to FIG. 2, there is shown an image outputting apparatus which employs an image outputting method according to the present invention. The image outputting apparatus is constructed so as to output images suitable for a lenticular lens display and employs, as an outputting apparatus, a printer of the thermal sublimation type having a line type thermal head.

The image outputting apparatus shown includes a thermal head 106, and a lenticular lens sheet 116. The lenticular lens sheet 116 includes a large number of lenticular lenses each having a width p and arranged at the pitch p in a widthwise direction of the lenticular lens sheet 116. The lenticular lens sheet 116 is fed to a platen 113 by feeding means not shown in a feeding direction coincident with the arrangement direction of the lenses while a flat rear face thereof on which images are to be printed is directed toward the thermal head 106.

In this instance, a ribbon 108 impregnated with a sublimable dyestuff is held between the thermal head 106 and the flat rear face of the lenticular lens sheet 116. The ribbon 108 is supplied, for example, from a reel 109S, held on the rear face of the lenticular lens sheet 116 by a pair of ribbon guides 112 on the opposite sides of the thermal head 106, and taken up onto another reel 109T. Taking up of the ribbon 108 is performed by a motor 110 by way of a motor driver 111. Driving control of the motor driver 111 is performed by a system control circuit 107 which control the entire system.

Meanwhile, the platen 113 is driven by a platen motor 114 by way of a motor driver 115. The motor driver 115 is controlled by the system control circuit 107, and the feeding amount of the lenticular lens sheet 116 per one picture element is controlled and adjusted relative to the pitch p of the lenticular lenses of the lenticular lens sheet 116.

To allow the feeding control, lens pitch detection means 121 for measuring the arrangement pitch p of the lenticular lenses on the lenticular lens sheet 116 is provided. The lens pitch detection means 121 includes a light source 117, a slit member 118 having a slit formed therein, a lens 119, and a photosensor 120. A beam of light emitted from the light source 117 is restricted by the slit of the slit member 118, collimated into a parallel beam of light by the lens 119 and irradiated upon the rear face of the lenticular lens sheet 116. The parallel light incident to the rear face of the lenticular lens sheet 116 is converged by the lenticular lenses and introduced into the photosensor 120.

In this instance, the light incident to the photosensor 120 exhibits its maximum amount and also the output of the photosensor 120 exhibits a highest level when the center of the photosensor 120 is coincident with the center of a lenticular lens of the lenticular lens sheet 116. Accordingly, the position of each lenticular lens on the lenticular lens sheet 116 can be discriminated by supervising the output of the photosensor 120.

In this instance, since the distance between the locations of the photosensor 120 and the thermal head 106 is fixed with the individual apparatus, picture elements can be outputted in accordance with the pitch of the lenticular lenses of any lenticular lens sheet on which the lenticular lenses are arranged at a different pitch.

The thermal head 106 outputs picture elements in the following manner.

An interface 101 is connected to an external computer which handles image data, and various data such as picture data re-arranged for a lenticular lens image display and a print pitch which are sent thereto from the external computer are fetched into the image outputting apparatus by way of the interface 101. On the contrary, the pitch of the lenticular lenses of the lenticular lens sheet 116 in use and the pitch of thermal printing elements of the thermal head 106 are outputted to the external computer by way of the interface 101.

Image data supplied from the external computer and fetched into the image outputting apparatus by way of the interface 101 are stored into an image memory 102. An image memory control circuit 103 performs read control of the image memory 102 so that data are read out from the image memory 102 in an order of a scanning direction for printing or in an order required for signal processing by a signal processing circuit 104.

The signal processing circuit 104 performs conversion of color signals (R, G, B to Y, M, C) or gamma ($\gamma$) conversion. Picture element data from the signal processing circuit 104 are converted into analog data by a digital to analog (D/A) conversion section 105 and outputted to the thermal head 106 of the sublimation type printer.

The interface 101, the image memory 102, the image memory control circuit 103, the signal processing section 104 and the digital to analog conversion section 105 are controlled by the system control section 107, and picture element outputting timings are controlled in association with feeding control for the lenticular lens sheet 116 by the platen 113 as described hereinabove.

FIG. 3 shows an exemplary system which outputs images photographed using an image printer apparatus in the form of the image outputting apparatus described above with reference to FIG. 2 and having a stereoscopic visual effect. The present image outputting system is constructed so as to obtain an image print having a stereoscopic visual effect using the image printer apparatus 100 of the construction wherein images are printed directly onto the lenticular lens sheet 116.

In particular, referring to FIG. 3, one or a plurality of electronic still cameras 22 wherein photographed images are stored onto an IC memory card 21 are prepared. The electronic still cameras 22 are installed so that a suitable parallax may be obtained with regard to an object 20 for photographing to take a plurality of photographs of the object 20. Data of the plurality of photographed images stored into the IC memory cards 21 are read by a computer 23, by which they are processed so that images which can be observed by stereoscopic vision through a lenticular lens device, and the thus processed data are outputted to the image printer apparatus 100. Details of the processing of the computer 23 such as re-arrangement of image data are disclosed in U.S. patent application Ser. No. 08/217743, filed on Mar. 25, 1994 by the applicant of the present patent application.

Referring back to FIG. 2, in this instance, the pitch of the lenticular lenses of the lenticular lens sheet 116 is detected by the lens pitch detection means 121 including the elements 117 to 120, and images are outputted with an image pitch determined based on the thus detected lens pitch in accordance with a method according to the present invention, which will be hereinafter described.

Figure 5:
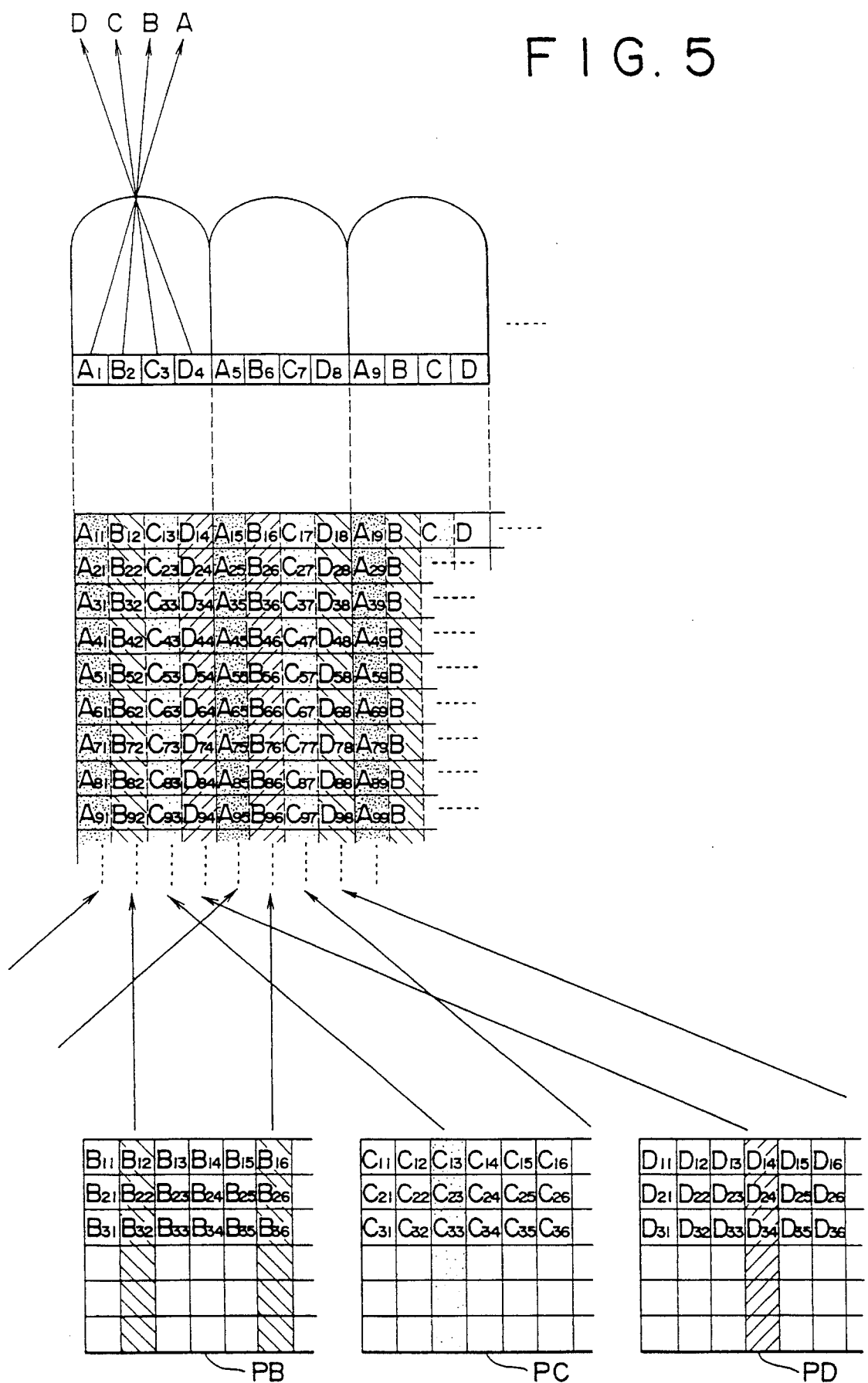

FIGS. 4 and 5 illustrate a concept of such re-arrangement of image data and outputs of the re-arranged data to the lower face of the lenticular lens sheet 116 as described above. For the space of the drawing, the concept is illustrated divisionally in FIGS. 4 and 5. As seen from FIGS. 4 and 5, output images are formed such that n images each cut out in a narrow paper tablet-like form successively from a plurality of, n, image data are arranged in the direction of a generating line of the lenticular lenses such that a set of such n images corresponds to one of the lenticular lenses of the lenticular lens sheet 116 and such sets of n images repetitively appear.

FIGS. 4 and 5 illustrate the concept described above where n=4. Thus, in FIGS. 4 and 5, a single image for a lenticular lens display is constituted from four images including an image PA constituted from picture elements Aij (i, j=1, 2, 3, . . . ), another image PB constituted from picture elements Bij, a further image PC constituted from picture elements Cij, and a still further image PD constituted from picture elements PD.

In the concept shown in FIGS. 4 and 5, every fourth picture elements having successively different phases from each other in a horizontal direction are extracted from the images PA, PB, PC, and PD and are arranged successively as seen in FIGS. 4 and 5 to construct an object image. In the images PA, PB, PC and PD shown in FIGS. 4 and 5, those picture elements indicated by slanting lines or dots are picture elements extracted or to be extracted while other picture elements are, in the present example, abandoned without being used for construction of an image.

In the image outputting method of the present invention, a set of images are outputted such that the pitch of them corresponding to the pitch of the lenticular lenses of the lenticular lens sheet 116 is made a little greater than the pitch of the lenticular lenses. In particular, in the concept illustrated in FIGS. 4 and 5, the pitch q of a set of four picture elements Aij, Bij, Cij and Dij corresponding to one pitch p of the lenticular lenses (that is, the width of a single lenticular lens) is made a little greater than the pitch p of the lenticular lenses.

Figure 6:
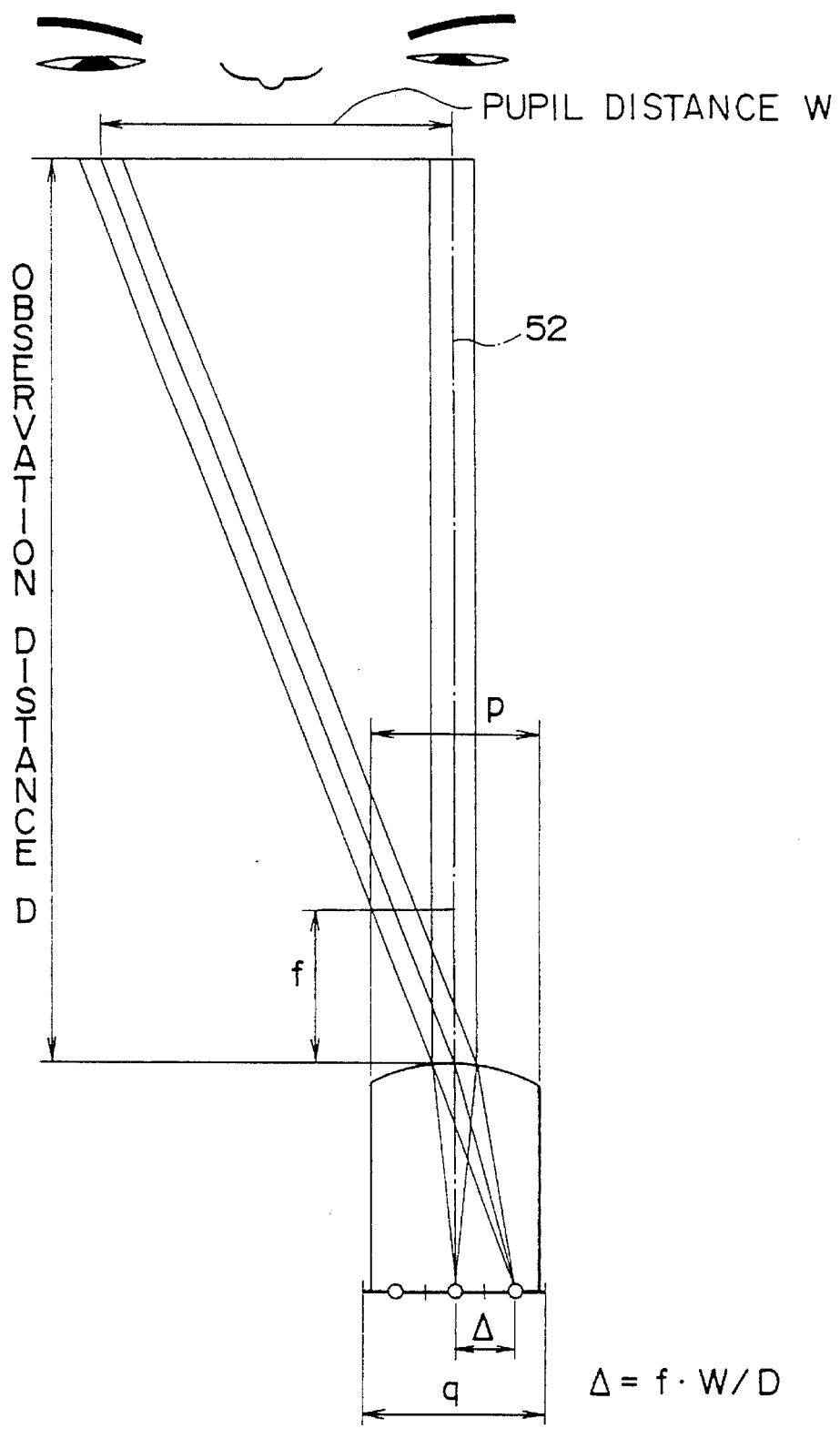
FIG. 6 is a diagrammatic view illustrating the principle of a stereoscopic observation effect based on a controlled output pitch of picture elements according to the present invention.

In this instance, where the observation distance from the surface of the lenticular lens sheet is represented by D and the focal length of the lenticular lenses is represented by f as seen in FIG. 6, the increment $\epsilon$ of the pitch q of a set of picture elements corresponding to the pitch p of the lenticular lenses, that is, q−p, is made substantially equal to $$\epsilon = p \cdot f / D \qquad (1)$$

FIGS. 1A and 1B illustrate an effect on a lenticular lens display where the image output pitch is set greater by such increment $\epsilon$ than the lenticular lens pitch p. As seen from FIG. 1A, where the focal length of the lenticular lenses is represented by f, the lenses are formed with a thickness substantially equal to n·f, and images to be observed on the flat rear face side of the lenticular lens sheet are arranged substantially in such a manner as described above. Here, n is a refraction factor of the lenticular lenses.

It is known that a paraxial ray of light emitted from a point placed on the focal plane and displaced by x from the optical axis makes a parallel beam of light having an angle of $\theta = x/f$ with respect to the optical axis as seen from FIG. 1B. In other words, $$\sin \theta = n \cdot \sin \phi$$

and, since the angles $\theta$ and $\phi$ are small with a paraxial ray of light, $$\theta \equiv n \cdot \phi$$

Therefore, $$\begin{aligned} x &= n \cdot f \cdot \tan\theta \\ &\approx n \cdot f \cdot \phi \\ &\approx f \cdot \theta \end{aligned}$$

Then, at the position spaced by the observation distance D from the lenticular lenses, the beam of light is displaced by D·$\theta$ from the optical axis.

Further, as seen from FIG. 1A, the optical axis 51 of a lenticular lens 53, an aimed picture element and one of the two eyes of the observer are positioned on a same straight line, and a next picture element obtained from the same photographed image PA as the aimed picture element is outputted from a location displaced by a distance equal to the pitch q.

The pitch q is a little greater than the lenticular lens pitch p, and where the displacement between the optical axis 52 of the adjacent lenticular lens 54 and the next picture element is represented by $\epsilon$, $\epsilon = q-p$.

A ray of light emitted from the position spaced by the displacement $\epsilon$ from the optical axis makes a beam of light having an angle of $$\theta = \epsilon / f$$

with respect to the optical axis 52, and at the observation position displaced by the distance D from the lenticular lens, the beam of light is observed at a position spaced by $$L = D \cdot \theta = D \cdot \epsilon / f$$

from the optical axis 52 of the lenticular lens 54.

Accordingly, if the image is disposed so that $\epsilon$ may be given by the expression (1)

$$\epsilon = f \cdot p / D$$

then the distance L is L=p. In other words, at the observation distance D, the optical axis 51 of the lens 53 and the beam of light from the aimed picture element transmitted through the lens 54 intersect with each other.

This signifies that, at the observation distance D, a same photographed image, for example, the image PA, is observed through the two lenses 53 and 54 and signifies more generally that a single image can be restored and observed from a plurality of images sampled out and disposed successively in a rectangular paper tablet-like form from a single point of view through lenticular lenses.

Further, in the present example, where the distance between a pair of small image portions under a lenticular lens observed separately through the lenticular lens by the two eyes is represented by $\Delta$ (in the example shown in FIG. 1A, since adjacent small image portions are observed by the two eyes, $\Delta$ is equal to the distance between adjacent picture elements), the output pitch of the picture elements is controlled so that the distance $\Delta$ may be equal to a value given by $$\Delta = f \cdot W/D \tag{2}$$

FIG. 6 illustrates the principle of a stereoscopic observation effect based on the thus controlled output pitch of picture elements. In this instance, rays of light emitted from each two adjacent picture elements make, at the observation distance D, beams of light spaced by $$D \cdot \theta = D \cdot \Delta / f = W$$

from each other. In other words, if the picture elements are visually observed at the position with the pupil distance W, then they can be visually observed separately with the two eyes.

In order to set such a picture element distance as described above, in the system shown in FIG. 3, the pupil distance W, the observation distance D and the lenticular lens focal length f can be set as parameters by the computer 23.

Further, in the present example, where the distance between a pair of small image portions under a lenticular lens observed separately by the two eyes through the lenticular lens is represented by $\Delta$ and the distance (pupil distance) between the two eyes of the observer is represented by W, the increment $\epsilon$ of a set of images corresponding to the single lenticular lens is set so that it may substantially satisfy the expression $$\epsilon/p = \Delta/W \tag{3}$$

to make the pitch of the set of image data corresponding to the single lenticular lens greater than the arrangement pitch p of the lenticular lenses.

Figure 7:
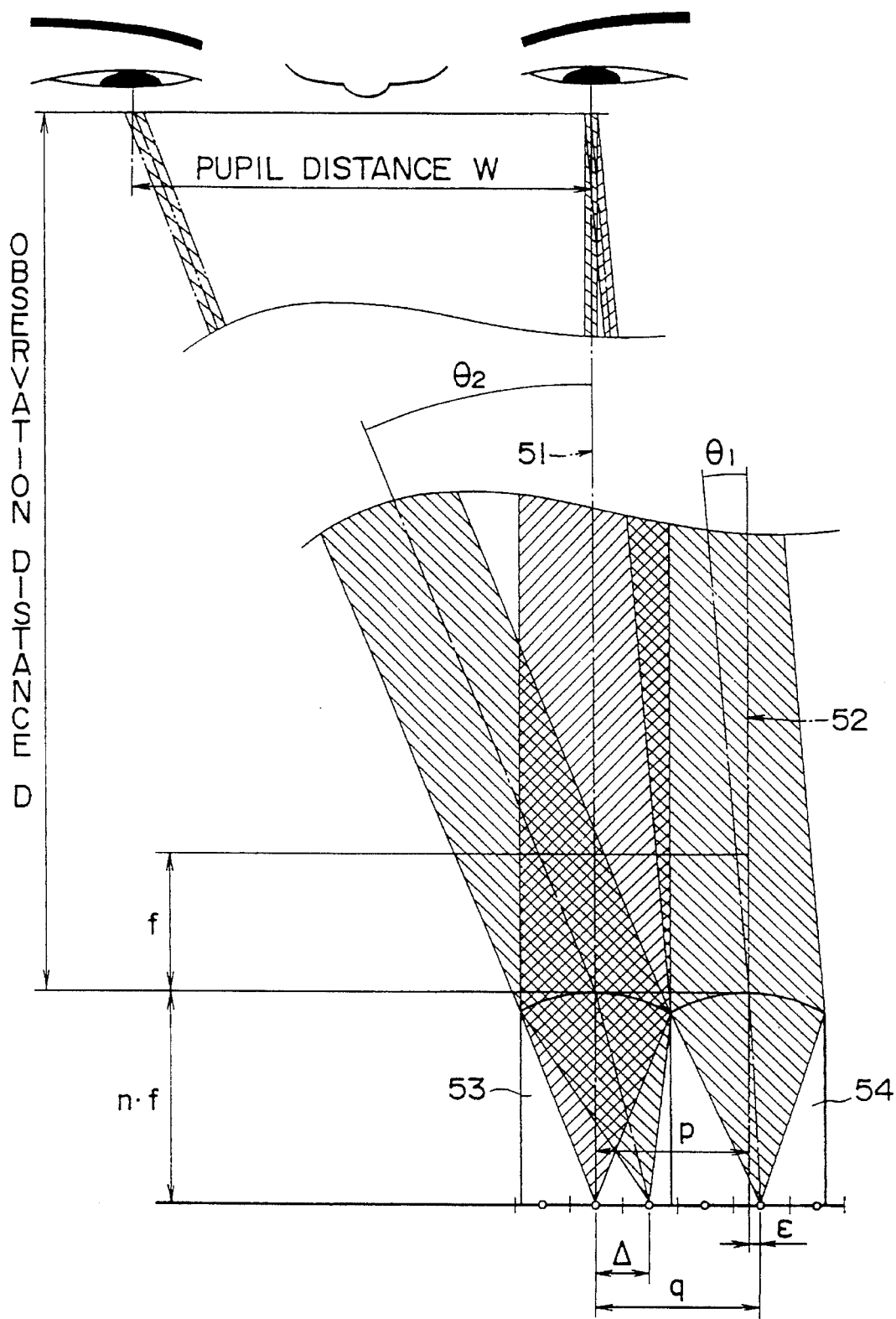
FIG. 7 is a diagrammatic view illustrating an effect of an image output pitch on a lenticular lens display according to the present invention.

FIG. 7 illustrates an effect of the just described image output pitch on a lenticular lens display.

Now, since picture elements from a same image disposed at the pitch q must be visually observed by a single eye at the observation position spaced by the distance D, rays of light must be converged, at the distance D, by the distance equal to the lenticular lens pitch p. In this instance, the proportional relationship $$\epsilon = f \cdot p/D$$

stands between the lens focal length f and the observation distance D, and here, if the relationship of the expression (3) given hereinabove is satisfied, then $$\Delta = f \cdot W/D$$

stands similarly. This signifies that rays of light from picture elements spaced by $\Delta 0$ from each other are spaced, at the distance D, by a distance equal to the pupil distance W, and consequently, different images having an anticipated parallax can be visually observed by the two eyes.

The relationship of the expression (3) given hereinabove can be obtained from the expressions (1) and (2) given hereinabove, and if any two of the three relational expressions are independent and satisfied, then the remaining one is satisfied automatically. Here, the expression (3) does not include any characteristic (focal length or the like) of the lenticular lens nor the observation distance, and thus is a definition of a requirement of higher generalization for an image display where a lenticular lens device is employed.

In other words, this signifies that, if only the relationship of the expression (3) is satisfied, then even if a lens parameter such as a lens focal length varies, anticipated different images can be visually observed, at a certain observation position, by the two eyes through the lenticular lenses. For example, even if lens plates have different lens focal lengths depending upon the manufacturing method, any of the lens plates allows stereoscopic vision at a certain distance only if the lens pitch and the image output pitch as well as the picture element arrangement distance from images having a parallax satisfy the expression (3).

The values of the parameters are examined by way of an actual example. In particular, if four picture elements sampled one by one from four parallax images are disposed corresponding to lenticular lenses having a lens pitch p=0.2 mm and two adjacent ones of the four picture elements are visually observed by the two eyes, then $$\Delta = p/4 = 0.05 \ (mm)$$

If the pupil width W is W=65 mm, then $$\epsilon = \Delta \cdot p/W = 1.538^{-4} \ (mm)$$

If the display width of the entire lenticular lens sheet is 200 mm, then a totaling 1,000 lenticular lenses are included in the display width, and accordingly, an accumulated output image pitch increment is about 0.15 mm.

Figure 8:
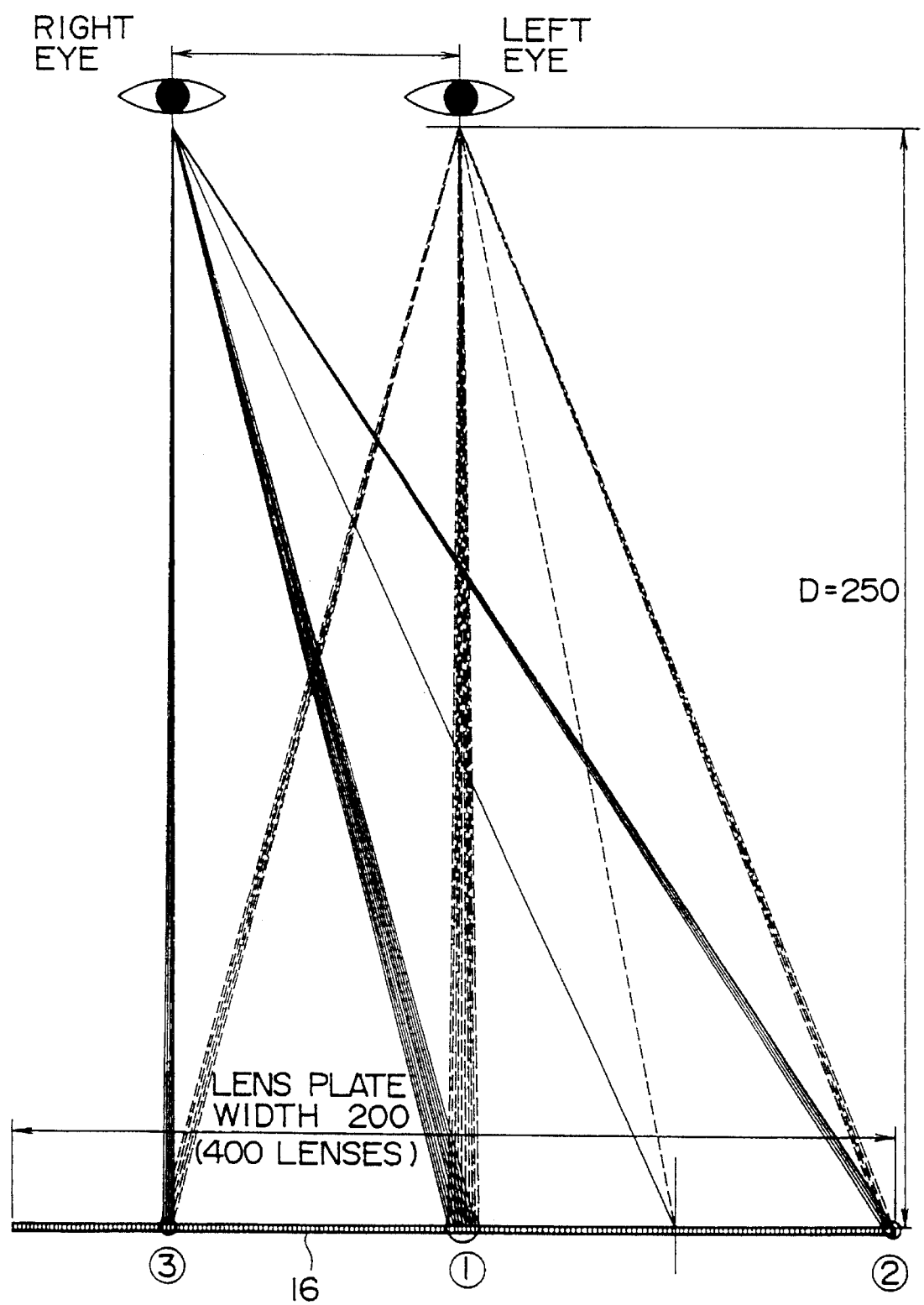
FIG. 8 is a diagrammatic view illustrating visual observation of output images obtained by the image outputting apparatus shown in FIG. 2.

FIG. 8 shows an example of lenticular lens print formed with the print pitch corrected in such a manner as described above. In the example shown, picture elements Ai, Bi and Ci of three images PA, PB and PC photographed from three directions of different parallaxes are disposed for one lens of a lens sheet of the lens pitch p=0.5.

If the correction amount for the pitch in the method of the present embodiment is represented by $\epsilon$ and two adjacent ones of the three picture elements are visually observed by two eyes, then $\Delta$ is given by $$\Delta = (p+\epsilon)/(k/m)$$

From this expression and the expression (3) given hereinabove, $$\epsilon = k \cdot p^2/(m \cdot W - k \cdot p) \tag{4}$$

and the image output pitch is defined by the expression (4). Here, m is the number of picture elements to be disposed below a single lenticular lens, and k is the number representative of a picture element distance over which those two of the m picture elements which are to be visually observed are spaced from each other, and in this instance, m=3, and k=1.

Here, if the pupil width W is 65 mm, then, from the expression given above, $$\epsilon = 1.285 \times 10^{-3}$$

Further, from the relationship of the expression (1) given hereinabove, $$f/D = \epsilon/p \approx 2.571 \times 10^{-3}$$

and if the observation distance D is D=250, then the lens focal length f is given by $$f \cong 0.643$$

(in this manner, once m and k are determined, the corresponding image output pitch is determined).

In FIG. 8, the total number of lenticular lenses is 400 and the width of the screen is 200 mm, and the left eye is positioned at the center of the screen while the lenticular lens just below the left eye coincides at the center thereof with three picture elements.

Figure 9:
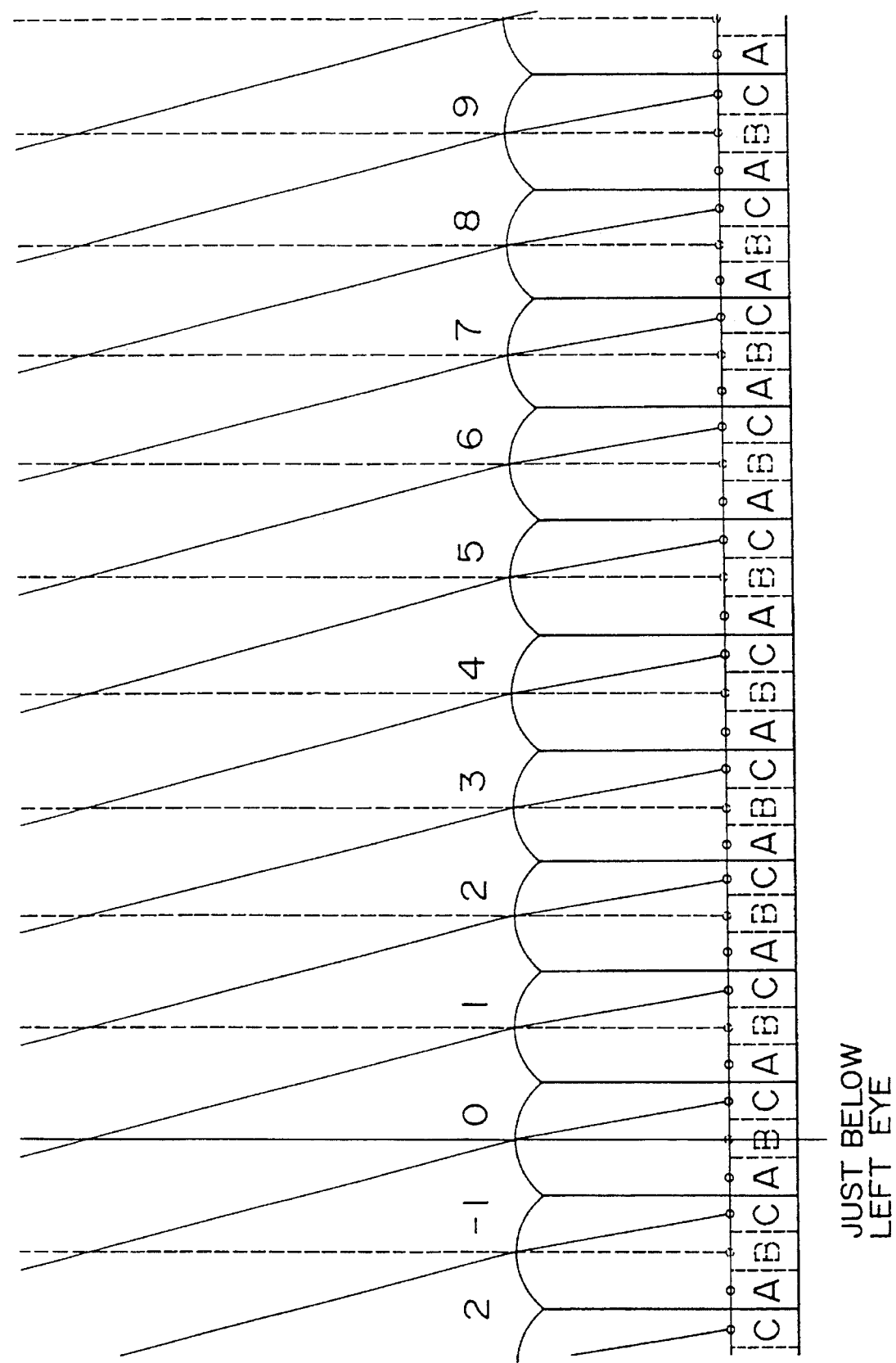
FIG. 9 is a partial enlarged view showing details of a portion ① in FIG. 8.
Figure 10:
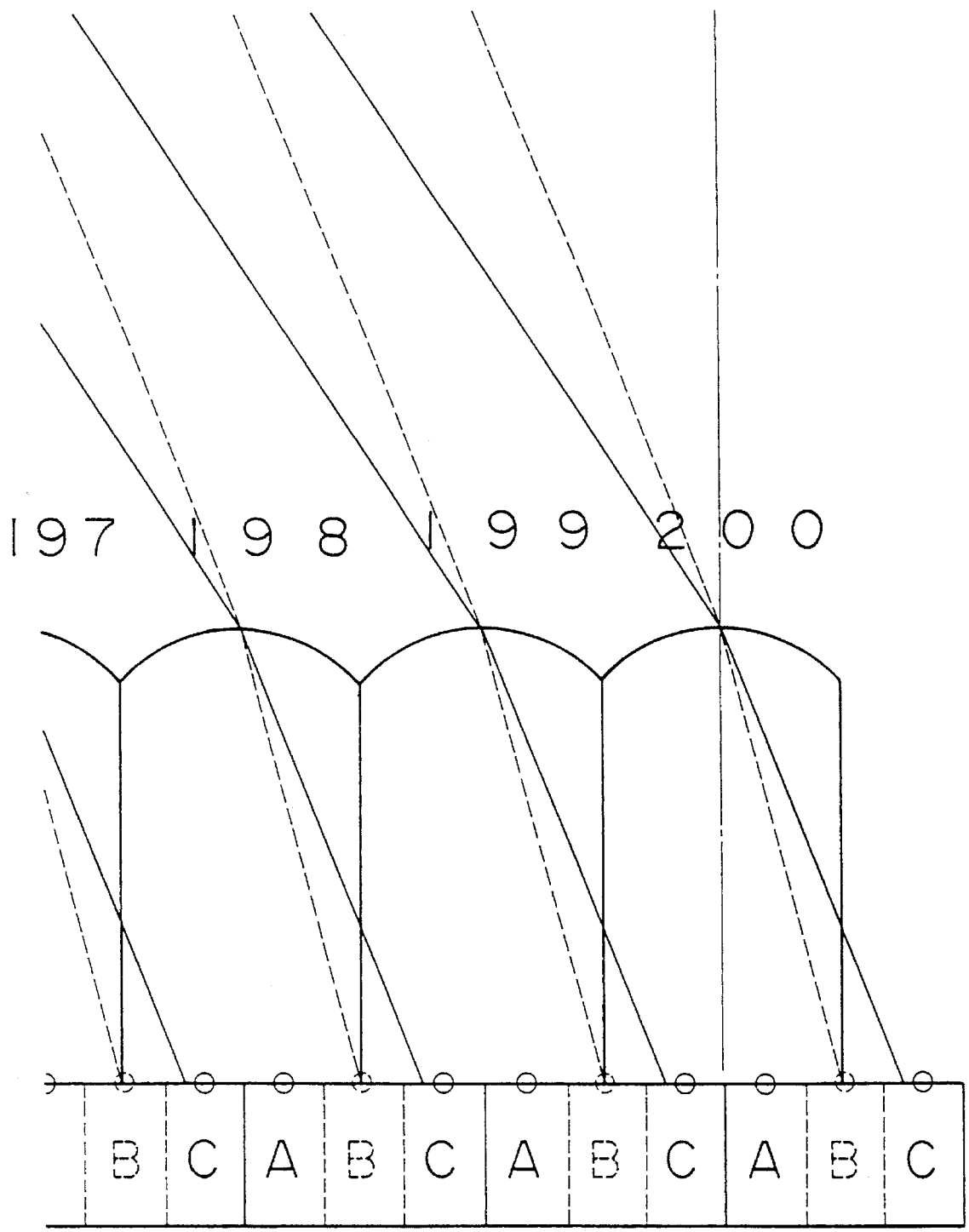
FIG. 10 is a similar view but showing details of another portion ② in FIG. 8.

FIG. 9 shows an enlarged view of a portion indicated by ① in FIG. 8, and FIG. 10 shows an enlarged view of another portion indicated by ② in FIG. 8. From FIGS. 9 and 10, it can be seen that anticipated picture elements are visually observed by the two eyes due to the picture element output pitch defined by the expression (4) above. In FIGS. 9 and 10 and FIGS. 11 and 12, which will be hereinafter described, each reference numeral denotes the number of a lens as counted from the lenticular lens at the center of the lenticular lens sheet 116 when the lenticular lens at the center is numbered 0.

Figure 11:
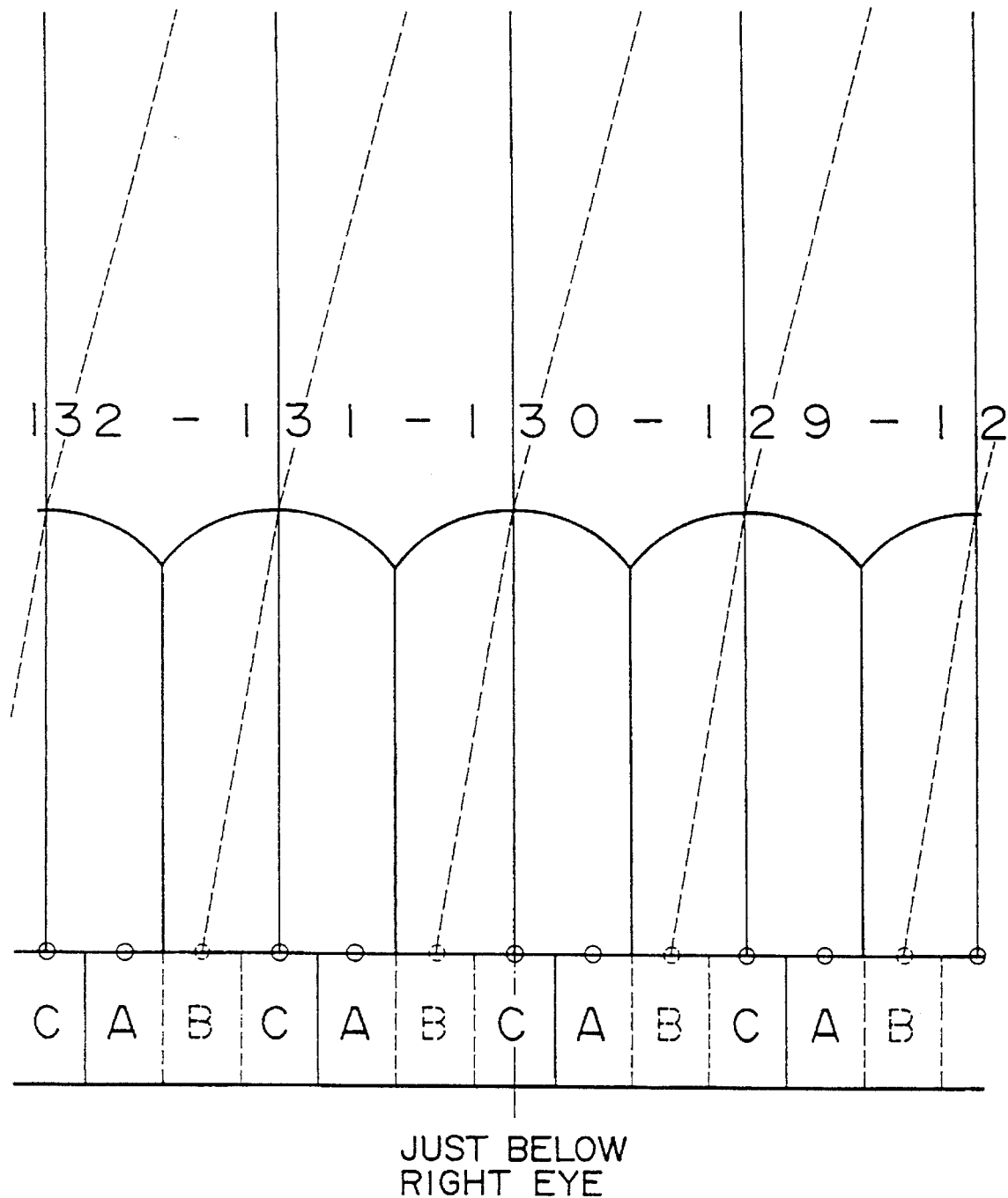
FIG. 11 is a similar view but showing details of a further portion ③ in FIG. 8.

Meanwhile, FIG. 11 is an enlarged view showing picture elements at a lenticular lens portion just below the right eye. In FIG. 11, a picture element displaced just by one picture element distance from a central portion corresponds to the center of the lens. This is because, as can be seen also from the following expression $$W/p = \Delta/\epsilon$$

obtained by modification of the expression (3) above, the distance between lenses spaced by the pupil distance W and the distance between lenses between which the output pitch is spaced by a distance between picture elements visually observed by the two eyes are equal to each other, and also this indicates that the expression (3) give above is correct.

Figure 12:
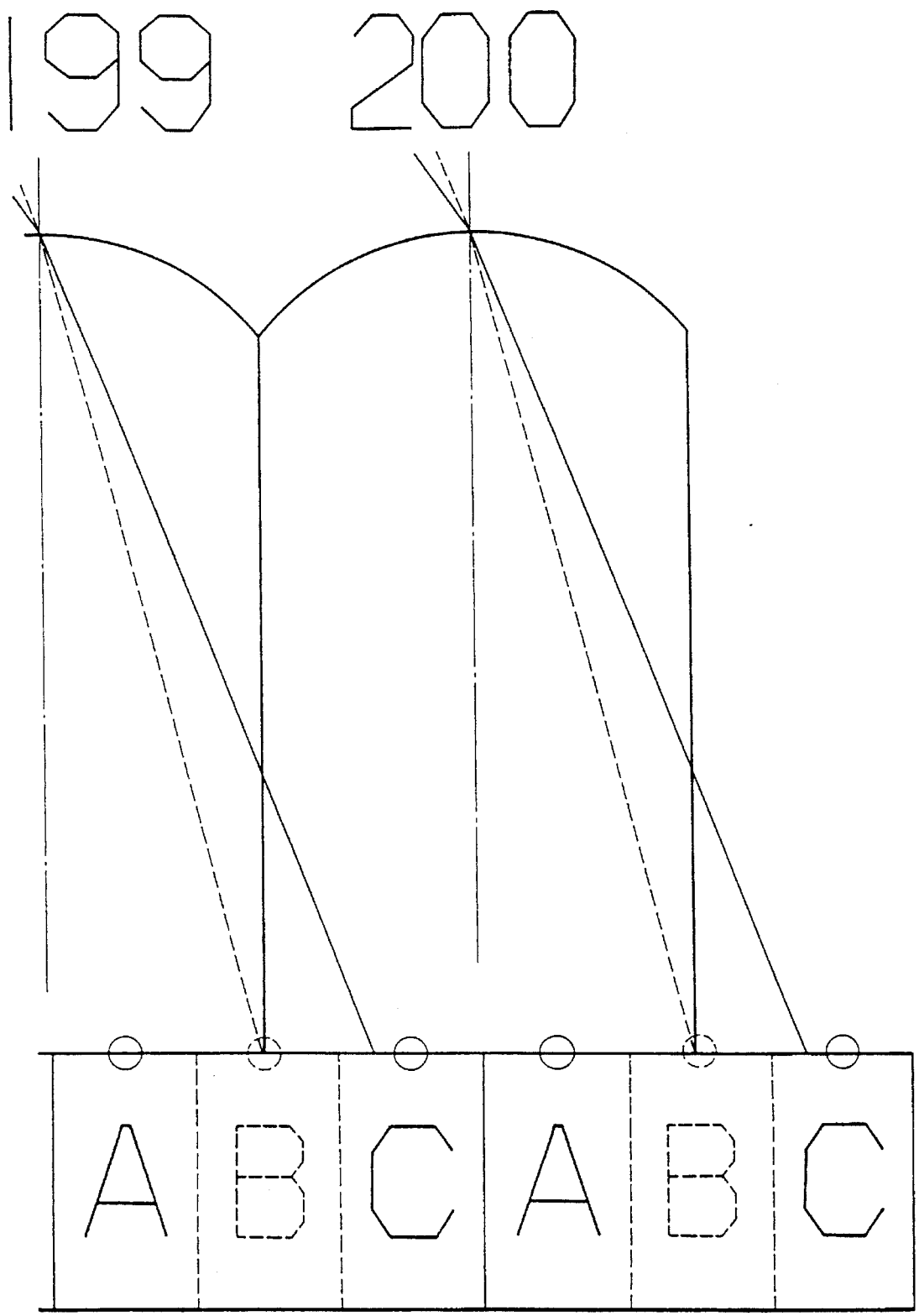
FIG. 12 is a partial enlarged view of a portion shown in FIG. 10.

However, from FIG. 12 which is a further enlarged view of FIG. 10, it can be seen that there is a displacement between the center of a picture element and a ray of light passing the center of a corresponding lenticular lens. This is because the image outputting method described so far premises a paraxial ray of light of a lens. A method of correcting the displacement to achieve accurate adjustment of the pitches will be described below.

Figure 13:
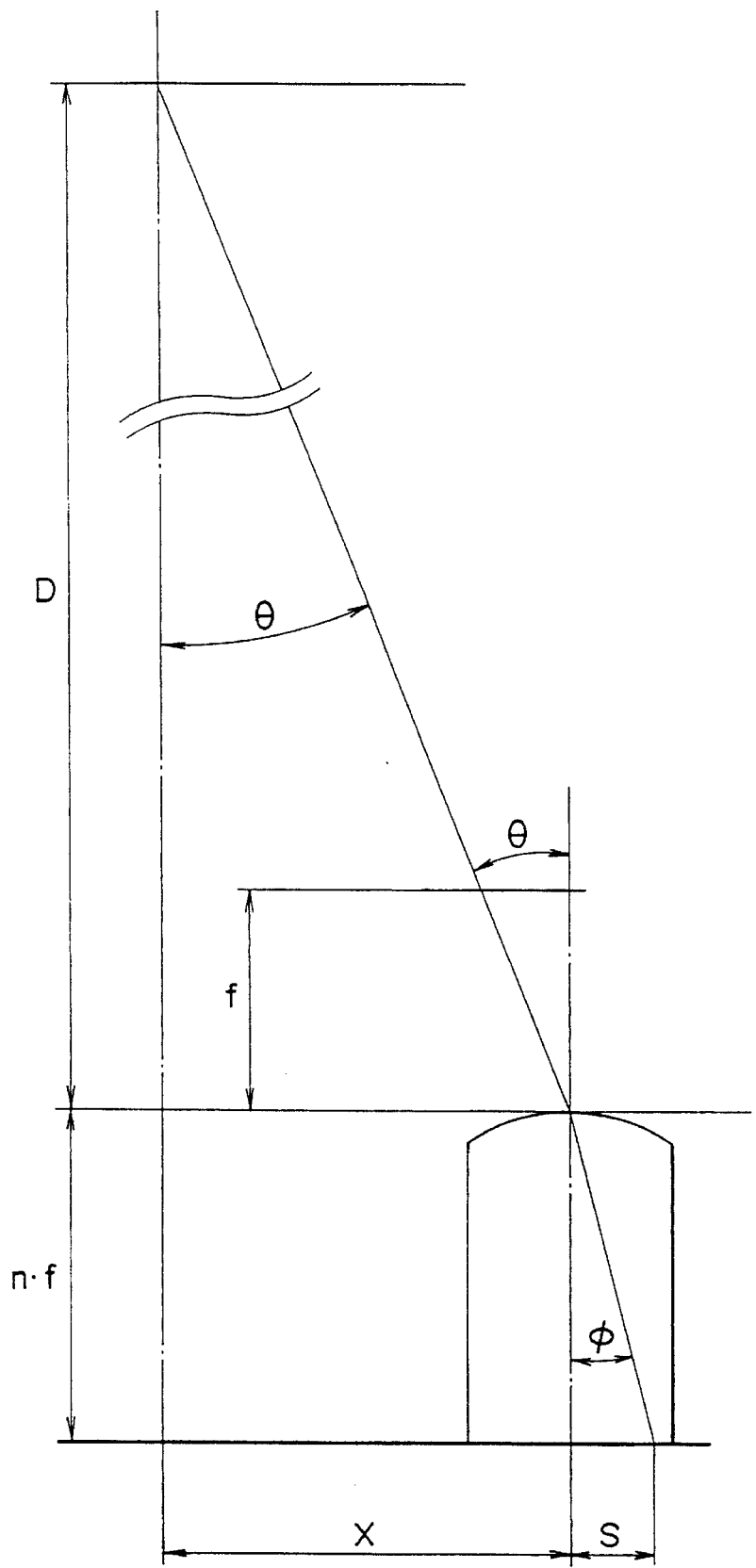
FIG. 13 is a diagrammatic view illustrating a method of achieving accurate adjustment of the image output pitch and the lenticular lens pitch according to the present invention.

FIG. 13 illustrates the method and shows a route of a ray of light introduced from a certain point of view into the center of a lens. Where an incident angle θ and a refraction angle φ are taken as shown in FIG. 13 and the vertical distance between the point of view and the lens is represented by D, the distance between them in a perpendicular direction is represented by x, and the distance over which the ray of light advances in the same direction as that of x in the lenticular lens is represented by s, then the following relationships stand:

$$\sin\theta = n \cdot \sin\phi$$

$$x = D \cdot \tan\theta$$

$$s = n \cdot f \cdot \tan\phi$$

Here, as regards the variation of the distance s relative to a small variation of the distance x, the following relationship stands:

$$\begin{aligned}
ds/dx &= ds/d\phi \cdot d\phi/d\theta \cdot d\theta/dx \\
&= n \cdot f/\cos^2\phi \cdot \cos\theta/n \cdot \cos\phi \cdot \cos^2\theta/D \\
&= (f/D) \cdot (\cos\theta/\cos\phi)^3
\end{aligned}$$

If one pitch p of the lenticular lenses is taken as the small variation of the distance x, then the small variation ds of the distance s represents a necessary image output pitch variation, that is, $\epsilon$. In particular, the relationship given by $$\epsilon = (f \cdot p/D) \cdot (\cos\theta/\cos\phi)^3 \quad (5)$$

expands the range over which accurate pitch correction can be performed to a range in which approximation is not paraxial approximation (θ is greater).

When θ is small in the expression (5) above, the correction amount $\epsilon_0$ is given by $$\epsilon_0 = f \cdot p \cdot D$$

which coincides with the expression (2) given hereinabove.

As θ increases from 0, the value of $\epsilon$ decreases gradually. It is considered that a lenticular image is visually observed from the center of the front, and accordingly, if the center of a lenticular lens and the picture are adjusted to each other at or around the center of the image, then accurate pitch adjustment can be achieved by employing a value obtained from the expression (5) as a correction amount with which the image is outputted with a little greater image pitch than the lenticular lens pitch.

If the angle over which the lenticular lens sheet 16 is viewed from the observation distance D is represented by $2 \cdot \theta_0$, then at the opposite ends of the image, the incident angle of a ray of light from the center of the image at the observation distance D to the center of a lens is $\theta_0$, and if the refraction angle of the ray of light then is represented by $\phi_0$, then the pitch correction amount $\epsilon_e$ at the opposite ends is given by $$\epsilon_e = (f \cdot p/D) \cdot (\cos\theta_0/\cos\phi_0)^3$$

while the pitch correction amount at an intermediate position between the opposite ends has an intermediate value between $\epsilon_0$ and $\epsilon_e$. If the entire screen is corrected with a suitable fixed value within the range, then a lenticular lens display wherein the pitch is fixed while least displacement are involved can be obtained.

The table of FIG. 14 illustrates the three different pitch correction amounts described hereinabove and strict values A of rays of light passing the centers of lenses in the lenticular lens observation system of FIG. 8, which are calculated by a numerical analysis, and in FIG. 14, values in the column B are obtained using correction amounts based on the expression (2); values in the column C are obtained using correction amounts based on the expression (5); and values in the column F are obtained using correction amounts intermediate between $\epsilon_0$ and $\epsilon_e$.

From the results illustrated in FIG. 14, it can be seen that correction substantially free from an error has been made by the variable pitch correction. Further, it can be seen that, by correction by the correction amounts based on the expression (5) in which peripheral pitch displacements are estimated, correction which includes less errors than correction based on a paraxial ray of light can be achieved.

In order to obtain such outputs, for which the picture element output pitch is corrected, on such an image printer which employs a thermal head of the line type as in the image outputting apparatus of FIG. 2, the head feeding direction must coincide with the arrangement direction of the lenticular lenses.

However, conversely where outputting based on a fixed pitch correction amount described above is allowed, that is, where the same lenticular lens sheet or a lenticular lens sheet of a fixed pitch is normally used, if the scanning direction for image outputs is made coincide with the arrangement direction of the lenticular lenses and the picture element pitch of, for example, a thermal head and the lenticular lens pitch are adjusted to each other, then accurate pitch adjustment is always possible.

Figure 15:
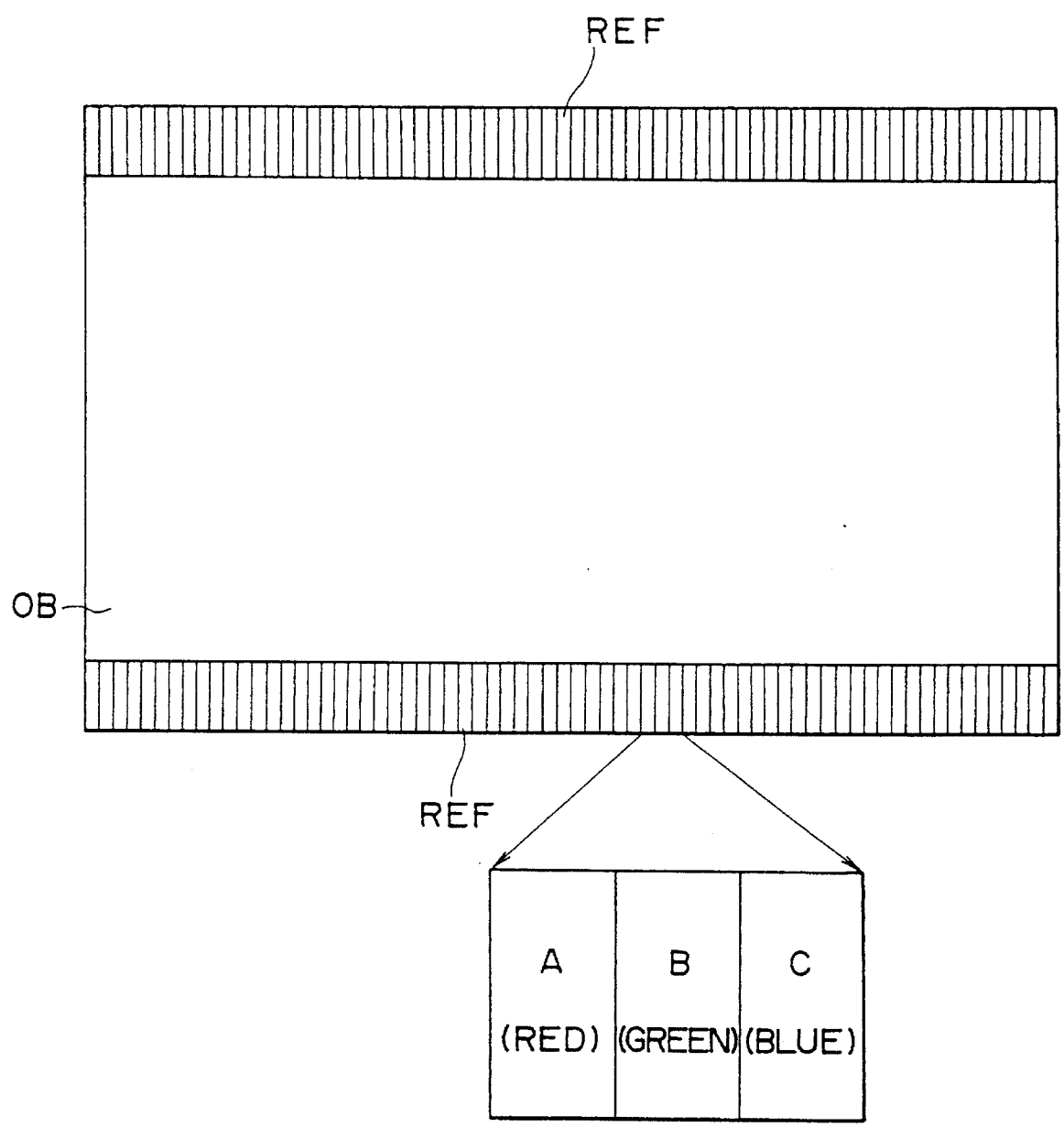
FIG. 15 is a diagrammatic view illustrating a method for confirmation of accurate adjustment of the image output pitch and the lenticular lens pitch according to the present invention.
Figure 16:
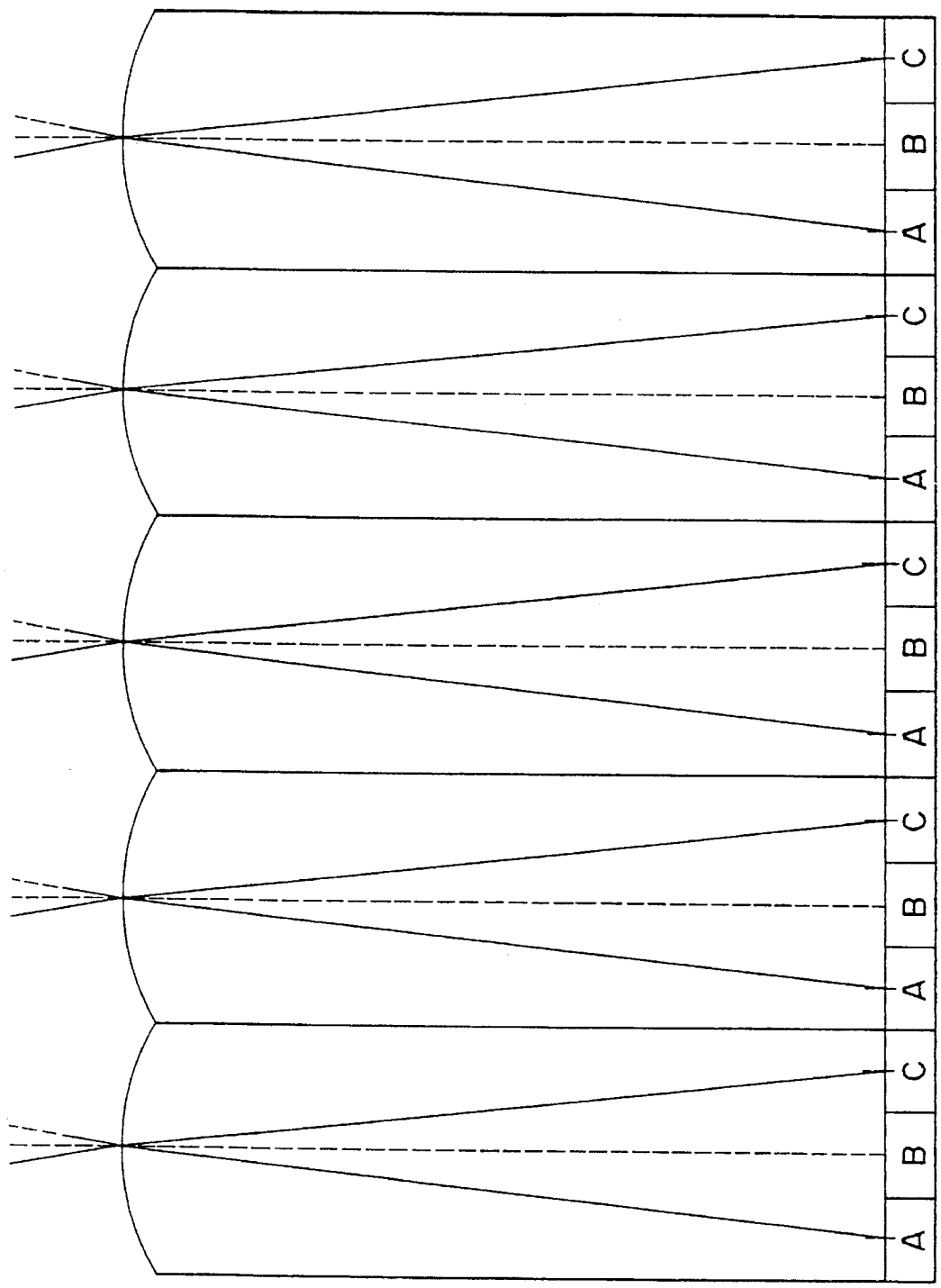
FIG. 16 is a diagrammatic view showing an exemplary conventional image display obtained using a lenticular lens apparatus.

A method of observing actually obtained lenticular image outputs to confirm whether or not the pitches accurately coincide with each other is performed in the following manner in the present embodiment. In particular, in the present embodiment, as shown in FIG. 15, an object display image OB is printed out substantially at a central location below the lenticular lens sheet. Then, regular patterns REF for confirmation of a pitch are printed out at locations above and below the image OB. The regular patterns REF have a regular repetitive variation in accordance with the image output pitch corresponding to the lenticular lenses as shown in FIG. 8 and FIG. 9 which is an enlarged view of FIG. 8.

For example, at the locations of the patterns REF, uniform images of red, green and blue are outputted at portions A, B and C corresponding to the image outputs A, B and C of FIG. 9. As a result, a regular pattern REF wherein red, green and blue appear regularly and repetitively is formed in accordance with the lenticular lens pitch as shown in FIG. 9.

If the pattern REF thus formed is visually observed from the predetermined observation distance D, if the image output pitch coincides accurately with the lens pitch, then it looks in a uniform color with one eye. Or, even where the pitches do not coincide with each other, an amount of displacement in pitch can be discriminated by reading the period in which the color of the pattern REF varies. Such a pitch checking image need not be provided on the entire face of the output image, and where it is disposed at a peripheral location as in the present example, it can be utilized together with original lenticular lens appreciation.

Having now fully described the invention, it will be apparent to one of ordinary skill in the art that many changes and modifications can be made thereto without departing from the spirit and scope of the invention as set forth herein.

What is claimed is:

1. A method of outputting images for stereoscopic vision, comprising the steps of:

using a lenticular lens device including a plurality of lenticular lenses arranged at a predetermined pitch p;

storing picture element data having a parallax; and successively outputting data of picture elements having a parallax for each set of n picture elements per one pitch of said lenticular lenses;

the pitch of each set of data of picture elements corresponding to one lenticular lens being set, at the last successive outputting step, greater than the arrangement pitch p of said lenticular lenses, wherein a regular image of a period corresponding to the pitch of said lenticular lenses is additionally provided on the display images so that displacement in pitch of the regular image from said lenticular lenses can be discriminated.

2. A method of outputting images according to claim 1, wherein the pitch of each set of picture element data corresponding to one lenticular lens is set greater than the arrangement pitch p of said lenticular lenses by an increment $\epsilon$ which substantially satisfies the following expression $$\epsilon/p = \Delta/W$$

where $\Delta$ is the distance between a pair of small image portions under said lenticular lens device which are visually observed separately by the two eyes through one of said lenticular lenses, and W is the distance between the two eyes or the pupil distance of the observer.

3. A method of outputting images according to claim 1, wherein the distance $\Delta$ between a pair of small image portions under said lenticular lens device observed separately by the two eyes through one of said lenticular lenses is set so as to satisfy the following expression $$\Delta = f \cdot W/D$$

where D is the observation distance from a surface of said lenticular lens device and f is a focal length of said lenticular lenses.

4. A method of outputting images for stereoscopic vision, comprising the steps of:

using a lenticular lens device including a plurality of lenticular lenses arranged at a predetermined pitch p;

storing picture element data having a parallax; and successively outputting data of picture elements having a parallax for each set of n picture elements per one pitch of said lenticular lenses;

the pitch of each set of picture elements corresponding to one pitch of said lenticular lenses being set, at the last successive outputting step, smaller at a peripheral portion of said lenticular lens device in the arrangement direction of said lenticular lenses than at a central portion of said lenticular lens device in the arrangement direction of said lenticular lenses.

5. A method of outputting images according to claim 4, wherein the ratio r of an image output pitch at the peripheral portion to an image output pitch at the central portion of said lenticular lens device in the arrangement direction of said lenticular lenses is substantially set to a value given by $$r = \{\cos^3\theta/\cos^3\phi\}$$

where $\theta$ is an angle of a noticed portion of said lenticular lens device with respect to a vertical direction when the noticed portion is viewed from a vertical information observation distance D at a central location of said lenticular lens device in the arrangement direction of said lenticular lenses, and $\phi$ is an angle which satisfies the expression $\sin\theta = n\sin\phi$ where n is a refraction factor of a material of said lenticular lens device.

6. A method of outputting images according to claim 4, wherein, where the angle over which said lenticular lens device is viewed from the distance D is represented by $2 \cdot \theta_0$ and the angle $\theta_0$ satisfies the following expression $$\sin\phi_0 = (\sin\theta_0)/n$$

the pitch of each set of image outputs at the peripheral portion of said lenticular lens device in the arrangement direction of said lenticular lenses is set greater than the arrangement pitch p of said lenticular lenses by an increment $\epsilon$ which substantially satisfies the following expression $$\epsilon p = \Delta/W$$

and the image pitch is set to a fixed value higher than r0 times the increment $\epsilon$ where $r_0$ is given by $$r_0 = \{\cos^3\theta 0/\cos^3\phi 0\}$$

7. An apparatus for outputting images for stereoscopic vision, comprising:

a lenticular lens device including a plurality of lenticular lenses arranged at a predetermined pitch p;

means for storing data of picture elements having a parallax;

means for successively outputting data of picture elements having a parallax for each set of n picture elements per one pitch of said lenticular lenses while setting the pitch of each set of picture element data greater than the arrangement pitch p of said lenticular lenses; and a regular image of a period corresponding to the pitch of said lenticular lenses is additionally provided on the display images so that displacement in pitch of the regular image from said lenticular lenses can be discriminated.

8. An apparatus for outputting images according to claim 7, wherein the pitch of each set of picture element data corresponding to one lenticular lens is set greater than the arrangement pitch p of said lenticular lenses by an increment $\epsilon$ which substantially satisfies the following expression $$\epsilon/p = \Delta/W$$

where $\Delta$ is the distance between a pair of small image portions under said lenticular lens device which are visually observed separately by the two eyes through one of said lenticular lenses, and W is the distance between the two eyes or the pupil distance of the observer.

9. An apparatus for outputting images according to claim 7, wherein the distance $\Delta$ between a pair of small image portions under said lenticular lens device observed separately by the two eyes through one of said lenticular lenses is set so as to satisfy the following expression $$\Delta = f \cdot W/D$$

where D is the observation distance from a surface of said lenticular lens device and f is a focal length of said lenticular lenses.

10. An apparatus for outputting images for stereoscopic vision, comprising:

a lenticular lens device including a plurality of lenticular lenses arranged at a predetermined pitch p;

means for storing data of picture elements having a parallax; and means for successively outputting data of picture elements having a parallax for each set of n picture elements per one pitch of said lenticular lenses while setting the pitch of each set of picture elements smaller at a peripheral portion of said lenticular lens device in the arrangement direction of said lenticular lenses than at a central portion of said lenticular lens device in the arrangement direction of said lenticular lenses.

11. An apparatus for outputting images according to claim 10, wherein the ratio r of an image output pitch at the peripheral portion to an image output pitch at the central portion of said lenticular lens device in the arrangement direction of said lenticular lenses is substantially set to a value given by $$r = \{\cos^3\theta/\cos^3\phi\}$$

where $\theta$ is an angle of a noticed portion of said lenticular lens device with respect to a vertical direction when the noticed portion is viewed from a vertical information observation distance D at a central location of said lenticular lens device in the arrangement direction of said lenticular lenses, and $\phi$ is an angle which satisfies the expression $\sin\theta = n\sin\phi$ where n is a refraction factor of a material of said lenticular lens device.

12. An apparatus for outputting images according to claim 10, wherein, where the angle over which said lenticular lens device is viewed from the distance D is represented by $2 \cdot \theta_0$ and the angle $\theta_0$ satisfies the following expression $$\sin\phi_0 = (\sin\theta_0)/n$$

the pitch of each set of image outputs at the peripheral portion of said lenticular lens device in the arrangement direction of said lenticular lenses is set greater than the arrangement pitch p of said lenticular lenses by an increment $\epsilon$ which substantially satisfies the following expression $$\epsilon/p = \Delta/W$$

and the image pitch is set to a fixed value higher than $r_0$ times the increment $\epsilon$ where $r_0$ is given by $$r_0 = \{\cos^3\theta_0/\cos^3\phi_0\}$$

13. An apparatus for outputting images for stereoscopic vision, comprising:

a lenticular lens device including a plurality of lenticular lenses arranged at a predetermined pitch p;

means for storing data of picture elements having a parallax; and means for successively outputting data of picture elements having a parallax for each set of n picture elements per one pitch of said lenticular lenses while setting the pitch of each set of picture element data greater than the arrangement pitch p of said lenticular lenses;

wherein said means for successively outputting is a printer.

14. An apparatus for outputting images according to claim 13, wherein the pitch of each set of picture element data corresponding to one lenticular lens is set greater than the arrangement pitch p of said lenticular lenses by an increment $\epsilon$ which substantially satisfies the following expression $$\epsilon/p = \Delta/W$$

where $\Delta$ is the distance between a pair of small image portions under said lenticular lens device which are visually observed separately by the two eyes through one of said lenticular lenses, and W is the distance between the two eyes or the pupil distance of the observer.

15. An apparatus for outputting images according to claim 13, wherein the distance $\Delta$ between a pair of small image portions under said lenticular lens device observed separately by the two eyes through one of said lenticular lenses is set so as to satisfy the following expression $$\Delta = f \cdot W/D$$

where D is the observation distance from a surface of said lenticular lens device and f is a focal length of said lenticular lenses.

* * * * *